Oct. 12, 1926.  
G. M. LITTLE ET AL  
1,602,915  
DRY CELL  
Filed Sept. 27, 1922
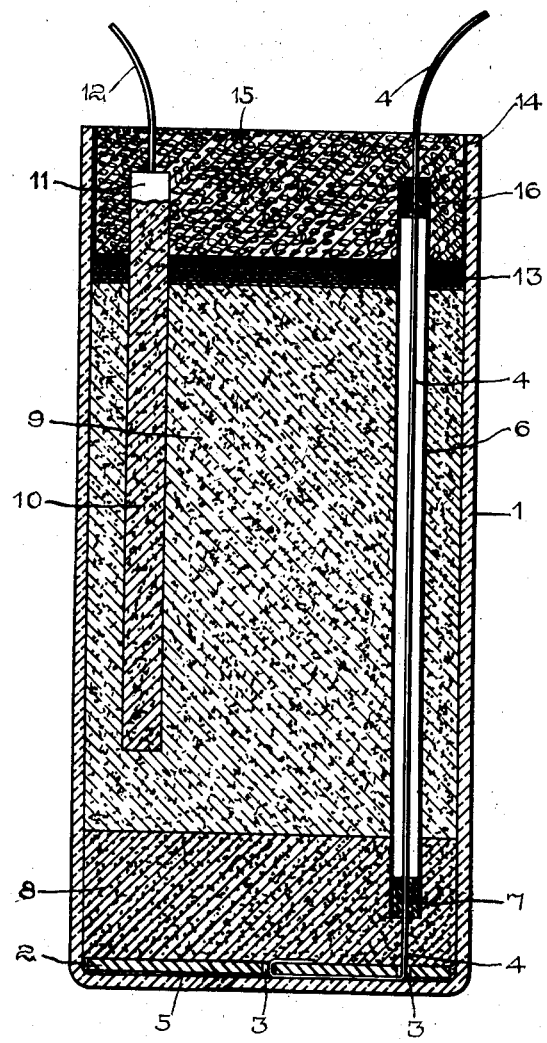
WITNESSES:
C. M. Cochran
H. C. Bierman
INVENTORS
George M. Little and
James G. Ford.
BY
ATTORNEY Patented Oct. 12, 1926.

1,602,915

UNITED STATES PATENT OFFICE.

GEORGE M. LITTLE, OF PITTSBURGH, AND JAMES G. FORD, OF WILKINSBURG, PENNSYLVANIA, ASSIGNORS TO WESTINGHOUSE ELECTRIC & MANUFACTURING COMPANY, A CORPORATION OF PENNSYLVANIA.

DRY CELL.

Application filed September 27, 1922. Serial No. 590,761.

This invention relates to dry cells, more particularly to that type of dry cell which is used in radio apparatus and is known as the "B" battery.

In batteries of this type previously used, the cell consisted of a zinc cup lined with a thin layer of a starch-paste mixture containing ammonium chloride and zinc chloride. Within the container was placed a porous cup of paper which was filled with a depolarizer, generally consisting of a mixture of manganese dioxide and carbon. In some cases, the paper was dispensed with and a cloth bag filled with a depolarizer was placed within the container. The cell was tightly sealed with ordinary sealing wax.

Cells made in this manner were capable of giving good service in radio apparatus but the quality of such cells was uncertain owing to, in a large measure, the rapid deterioration thereof on standing. The large area of contact between the zinc and the starch paste and depolarizer and the relative thinness of the starch paste allowed chemical action to proceed with comparatively great rapidity, thereby deteriorating the cell whether or not it was used. The cell was also expensive to make and only a small part of the zinc therein was used in generating a useful electric current. Most of the zinc was rendered useless for current-producing purposes when the electrolytic action in the cell formed holes in a few places in the zinc cup.

Such cells are generally assembled in units of about 15 to provide the necessary voltage for a "B" battery. Because of the necessity for a compact cell unit, each of such cells previously used had to be insulated from each other after assembling in order to prevent the accidental short-circuiting thereof. This added insulation further increased the cost of making such cells.

The present invention is designed to obviate the disadvantages of cells previously made, it being among the objects thereof to provide a cell of the type hitherto used which shall be relatively simple in construction, which may be readily assembled at a small cost, which shall have a relatively long life, both when in use and when idle, and which shall dispense with parts hitherto considered essential in cells of this kind.

In practising our invention, we provide a glass container, generally about two inches high and ¾ inch in diameter in the bottom of which is placed a heavily amalgamated zinc plate to which a lead wire is secured by any suitable means. A starch paste containing the electrolyte is placed on the zinc plate and a depolarizing paste is placed thereupon. A carbon-rod anode projects into the depolarizer, and the cell is sealed with suitable wax.

In the accompanying drawing constituting a part hereof and in which like reference characters indicate like parts, The single figure is a vertical cross-sectional view of a cell made in accordance with our invention.

We provide a container 1 of insulating material, generally consisting of glass and being cylindrical in shape. For a "B" battery, we generally utilize those glass containers which are known as "specimen tubes". In the bottom of the container 1 is placed a metal plate 2 consisting of a heavily amalgamated sheet of zinc having a plurality of openings 3 therein. A copper lead wire 4, the lower end of which is amalgamated, is inserted in said openings and bent to anchor the same to the plate. We may provide a layer or coating 5 of copper on the lower side of the plate 2 before amalgamating in order to make more certain contact between the plate and the lead wire.

A glass tube 6 surrounds the lead wire 4, the lower end 7 thereof being sealed with starch paste. The electrolyte 8 consists of a starch-paste mixture containing about 40 parts starch, 30 parts ammonium chloride, 20 parts zinc chloride and 26 parts water. The mixture is poured into the container until a sufficient thickness of layer has been formed to set and become semi-solid.

The depolarizing mixture 9 consists of about 40 parts manganese dioxide, 16 parts graphite, 3 parts ammonium chloride, 1.2 parts zinc chloride and sufficient water to make a stiff paste. The depolarizer is placed upon the electrolyte 8 in direct contact therewith. A carbon rod 10, which has been impregnated with paraffin, projects into the depolarizer 9 and has a metal cap 11 on the upper end thereof. The cap 11 may be formed in any desired manner but we have found that spraying copper on the end of the carbon rod by the Schoop process provides a permanent structure which is electrically efficient. A terminal or lead wire 12 is secured to the cap 11 in any suitable manner.

A layer 13 of separating material, such as paper, is placed on the depolarizer 9 and a thin layer of adhesive wax 14 spread on the walls of container 1 above the paper layer 13. Ordinary sealing wax 15 is poured into the top of the container to fill the same and seal the cell from the atmosphere. The top 16 of tube 6 is sealed with adhesive wax similar to wax 14.

A cell constructed in accordance with our invention has a number of advantages over the cell previously used. The glass container obviates the necessity for insulation, such as wax paper, between adjacent cells. It also makes feasible the use of amalgamated zinc in the cell, thereby preventing local action and the generation of gases because of impurities in the zinc. A cheap grade of zinc may be utilized and a much less quantity thereof is necessary in a cell having the same ampere hour capacity as prior cells. It allows the ready inspection of a completed cell.

The small area of zinc exposed to chemical action, the relatively small cross-section of the starch layer in contact with the depolarizer and the comparatively great thickness of the starch layer limit the diffusion in the cell and contribute to greatly limit the short-circuit output of the cell, rendering it capable of withstanding considerable abuse, such as a short circuit for an hour, with but very little permanent damage. Such a cell will recuperate in a day to nearly its full value.

This has the further desirable result that the cell, if accidentally short-circuited, will not rise in temperature as much as the zinc-cup cell of the old type, thereby further lessening chemical action and the consumption of the active ingredients of the cell, at the same time lessening the danger of softening of the wax seal. This feature makes the cell of no use where heavy work is demanded but it makes it almost fool-proof as a "B" battery where only .003 ampere is required.

Placing the zinc flat in the bottom of the cell lessens that local action which is, in the zinc-cup cell, caused by the zinc being exposed, in its different parts, to electrolytes of different strengths, the so-called "concentration cell effect", which is caused by the lower layers of electrolyte being of greater concentration than the upper layers. It prevents the zinc from being consumed in service more rapidly in one part than another and it makes possible the useful consumption of nearly all the zinc.

The omission of the cloth or paper separator and the replacement thereof by a thick layer of starch electrolyte "set" in place by heat does away with the danger of particles of depolarizer mixture working their way through the pores of the cloth or paper and making contact with the zinc, causing an internal short circuit. It greatly lessens labor and expense of assembly of the cell.

We claim as our invention:—

1. A cell comprising a container of non-conducting material, a metal plate in the bottom thereof, a terminal wire secured thereto, a tube of non-conducting material surrounding said terminal wire, the upper end of said tube being sealed by wax and the lower end by a starch paste, an electrolyte on said plate, a depolarizer on said electrolyte, and an electrode in said depolarizer.

2. A cell comprising a container of non-conducting material, a metal plate in the bottom thereof, a terminal wire threaded and secured to said plate, a layer of semisolid material containing electrolyte superimposed on said plate and in contact only with said plate electrode, a layer of semisolid material containing a depolarizer superimposed on said electrolyte, an electrode embedded in said depolarizer and in contact only therewith and means for insulating said terminal wire from said depolarizer.

3. A cell comprising a container of non-conducting material, a metal plate in the bottom thereof, a terminal wire secured thereto, a layer of semisolid material containing electrolyte over said plate and in contact only with said plate, a layer of semisolid material containing a depolarizer over said electrolyte, an electrode embedded in said depolarizer and a sealed tube of insulating material extending through said layer of depolarizer into said layer of electrolyte.

4. A cell comprising a container of non-conducting material, a layer of semisolid material containing a depolarizer superimposed on a layer of semisolid material containing an electrolyte, a metal plate embedded in said electrolyte, an insulating tube extending through said layer of depolarizer into said layer of electrolyte, a terminal adapted to make contact with said plate sealed in and extending through said tube, and a carbon rod provided with another terminal embedded in said layer of depolarizer material.

In testimony whereof, we have hereunto subscribed our names this 21st day of September, 1922.

GEORGE M. LITTLE.
JAMES G. FORD.